US012752705B2

(12) United States Patent
Blanco et al.

(10) Patent No.: US 12,752,705 B2
(45) Date of Patent: Oct. 6, 2026

(54) VEHICLE REARVIEW MIRROR WITH TAG HOOK HAVING A SUPPORT PORTION AND A RETAINING PORTION

(71) Applicant: Ford Global Technologies, LLC, Dearborn, MI (US)

(72) Inventors: Hatziry Garcia Blanco, Naucalpan de Juárez (MX); Jose Angel Gonzalez Gonzalez, Alvaro Obregon (MX); Juan Manuel Villarreal Castillo, Santiago de Querétaro (MX); Juan Moises Calleja Chavez, Coyoacan (MX); Miguel Angel Vargas Piedra, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 717 days.

(21) Appl. No.: 18/131,037

(22) Filed: Apr. 5, 2023

(65) Prior Publication Data

US 2024/0336195 A1 Oct. 10, 2024

(51) Int. Cl.
*B60R 1/04* (2006.01)
*B60R 1/12* (2006.01)

(52) U.S. Cl.
CPC ........ *B60R 1/04* (2013.01); *B60R 2001/1292* (2013.01)

(58) Field of Classification Search
CPC .............................................. B60R 2001/1292
See application file for complete search history.

(56) References Cited

U.S. PATENT DOCUMENTS

| | | | | |
|---|---|---|---|---|
| 5,037,051 | A * | 8/1991 | Moriello | B60R 7/08 211/113 |
| 6,276,081 | B1 | 8/2001 | Shedd | |
| 7,686,373 | B1 | 3/2010 | McCabe et al. | |
| 2002/0092958 | A1 | 7/2002 | Lusk | |
| 2004/0016162 | A1 | 1/2004 | Rendon | |
| 2004/0221498 | A1 | 11/2004 | Vico et al. | |

(Continued)

FOREIGN PATENT DOCUMENTS

| | | |
|---|---|---|
| JP | 2010182287 A5 | 8/2010 |
| WO | 2011049537 A2 | 4/2011 |

OTHER PUBLICATIONS

My Parking Permit, "Mirror Tag Eco Holder with Soft Plastic: Mirror Tag Silver Parking Permit Holder (TG-1327)" https://www.myparkingpermit.com/mirrortag-silver-magnetic-parking-placard-protector/sku-tg-1327, accessed on Mar. 7, 2023.

(Continued)

*Primary Examiner* — Paul C Lee
(74) *Attorney, Agent, or Firm* — Vichit Chea; Price Heneveld LLP

(57) ABSTRACT

A vehicle rearview mirror assembly includes a support arm configured to engage a vehicle. A rearview mirror assembly is operably coupled to the support arm. The rearview mirror assembly includes a housing that has an outer surface configured to be oriented in a vehicle-forward direction. The housing defines an opening. A tag hook is coupled to the outer surface of the housing. The tag hook includes a support portion extending from the outer surface and a retaining portion extending vertically from the support portion. A mirror is disposed within the opening of the housing.

17 Claims, 7 Drawing Sheets

(56) References Cited

U.S. PATENT DOCUMENTS

| | | | |
|---|---|---|---|
| 2005/0211768 A1 | 9/2005 | Stillman | |
| 2008/0148614 A1 | 6/2008 | Costar | |
| 2011/0154705 A1 | 6/2011 | Gardiner | |
| 2014/0335897 A1 | 11/2014 | Clem et al. | |
| 2015/0097388 A1 * | 4/2015 | Bosco | B60R 1/04 296/84.1 |
| 2015/0347600 A1 | 12/2015 | Tabe | |
| 2016/0027307 A1 | 1/2016 | Abhyanker et al. | |
| 2017/0200197 A1 | 7/2017 | Brubaker | |
| 2018/0114473 A1 * | 4/2018 | Chomicki | G09F 21/04 |
| 2020/0234380 A1 | 7/2020 | Dulori | |

OTHER PUBLICATIONS

Amazon, "2 MirorTag Charm by JL Safety—A Novel Way to Protect, Display & Put Away a Handicap Parking Placard. Magnetically On & Off. Fits All mirror sizes. 2 Holders and 2 Magnet Charms included. Made in USA", https://www.amazon.com/MirorTag-Charm-Safety-Handicapped-Magnetically/dp/B00OO2H3BO/ref=pd_lpo_2?pd_rd_i=B00OO2H3BO&psc=1, accessed on Mar. 7, 2023.

Ubuy, "Clear Horizontal Vehicle Parking Permit Pass Hanger Tag Holder—Hangs from Car Rear View Mirror—by Specialist ID, Sold Individually", https://www.ubuy.co.it/en/product/2AJH4N42-clear-horizontal-vehicle-parking-permit-pass-hanger-tag-holder-hangs-from-car-rear-view-mirror-by-sp, accessed on Mar. 7, 2023.

Dealer Supply Shop, "Hang Tag Holder", https://www.dealersupplyshop.com/Hang-Tag-Holder_p_806.html, accessed on Mar. 7, 2023.

Amazon, "LotFancy Handicap Placard Holder—10.6"x5", Ultra Transparent Disabled Parking Placard Protector Hanger Sleeve—Pack of 2, with Plastic Large Hanger", https://www.amazon.com, accessed Mar. 7, 2023.

* cited by examiner

VEHICLE REARVIEW MIRROR WITH TAG HOOK HAVING A SUPPORT PORTION AND A RETAINING PORTION

FIELD OF THE DISCLOSURE

The present disclosure generally relates to a vehicle rearview mirror assembly. More specifically, the present disclosure relates to a vehicle rearview mirror assembly with a tag hook.

BACKGROUND OF THE DISCLOSURE

Many vehicles include rearview mirrors for viewing an area to a rear of the vehicle. Further, many occupants of a vehicle may use the rearview mirror for holding or supporting items, such as passes.

SUMMARY OF THE DISCLOSURE

According to at least one aspect of the present disclosure, a vehicle rearview mirror assembly includes a support arm configured to engage a vehicle. A rearview mirror assembly is operably coupled to the support arm. The rearview mirror assembly includes a housing that has an outer surface configured to be oriented in a vehicle-forward direction. The housing defines an opening. A tag hook is coupled to the outer surface of the housing. The tag hook includes a support portion extending from the outer surface and a retaining portion extending vertically from the support portion. A mirror is disposed within the opening of the housing.

According to another aspect of the present disclosure, a rearview mirror assembly includes a housing that has an outer surface. The housing defines a connector for receiving a support arm. The housing includes an integral tag hook. The integral tag hook includes a support portion extending from the outer surface of the housing. A retaining portion extends vertically from the support portion. The retaining portion extends adjacent to the outer surface of the housing. The integral tag hook and the outer surface define a receiving space for hanging items on the integral tag hook. A mirror is disposed within an opening defined by the housing. The integrated tag hook and the mirror are on opposing sides of the housing.

According to another aspect of the present disclosure, a vehicle mirror assembly includes a housing that defines an opening. The housing includes an outer surface forming an arced shape. A connector is operably coupled to the outer surface and configured to receive a support arm. A tag hook is integrally formed with the housing. The tag hook includes a lower support portion that extends from the outer surface and a retaining portion extending vertically from the lower support portion to hold an item. A mirror is disposed within the opening of the housing.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION

Additional features and advantages of the presently disclosed device will be set forth in the detailed description which follows and will be apparent to those skilled in the art from the description, or recognized by practicing the device as described in the following description, together with the claims and appended drawings.

Figure 1:
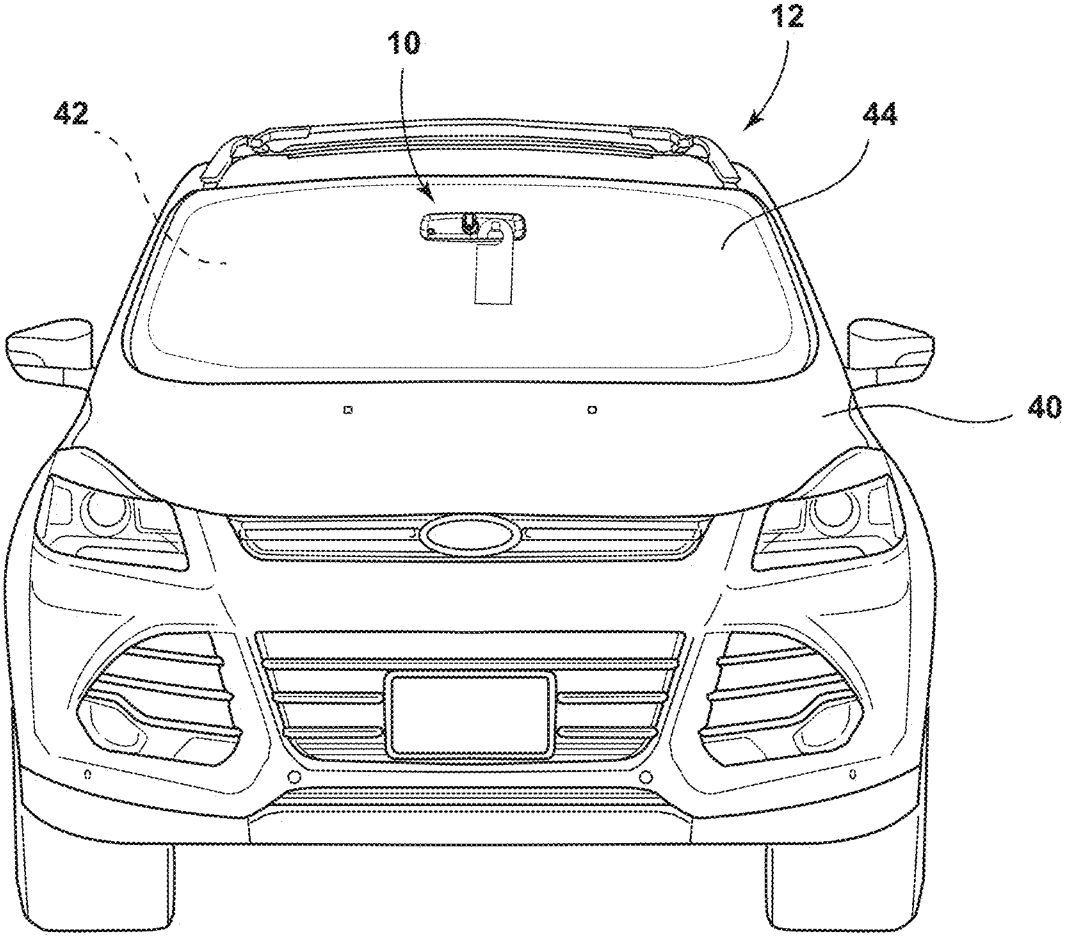
FIG. 1 is a front perspective view of a vehicle with a rearview mirror assembly, according to the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

With reference to FIGS. 1-9, reference numeral 10 generally designates a rearview mirror assembly for a vehicle 12 that includes a support arm 14 configured to engage the vehicle 12 and support the rearview mirror assembly 10. The rearview mirror assembly 10 is operably coupled to the support arm 14 and includes a housing 16 having an outer surface 18 configured to be oriented in a vehicle-forward direction. The housing 16 defines an opening 20, generally oriented in a vehicle-rearward direction. A tag hook 22 is coupled to the outer surface 18 of the housing 16. The tag hook 22 includes a support portion 24 extending from the outer surface 18 and a retaining portion 26 extending vertically from the support portion 24. The rearview mirror assembly 10 also includes a mirror 28 disposed within the opening 20 of the housing 16.

Referring to FIG. 1, the vehicle 12 may be a sedan, a sport-utility vehicle, a van, a truck, a crossover, other wheeled motor vehicles, or other styles of vehicles. The vehicle 12 may be used for personal and/or commercial purposes such as, ride-providing services (e.g., chauffeuring), transporting, deliveries, ridesharing services, etc. It is contemplated that the vehicle 12 may be a fully autonomous vehicle 12 (e.g., operated without a human driver), a partially autonomous vehicle 12 (e.g., operated with or without the human driver), or a manually operated vehicle 12 (e.g., operated with the human operator). Further, the vehicle 12 may switch between autonomous, semiautonomous and nonautonomous modes.

Figure 2:
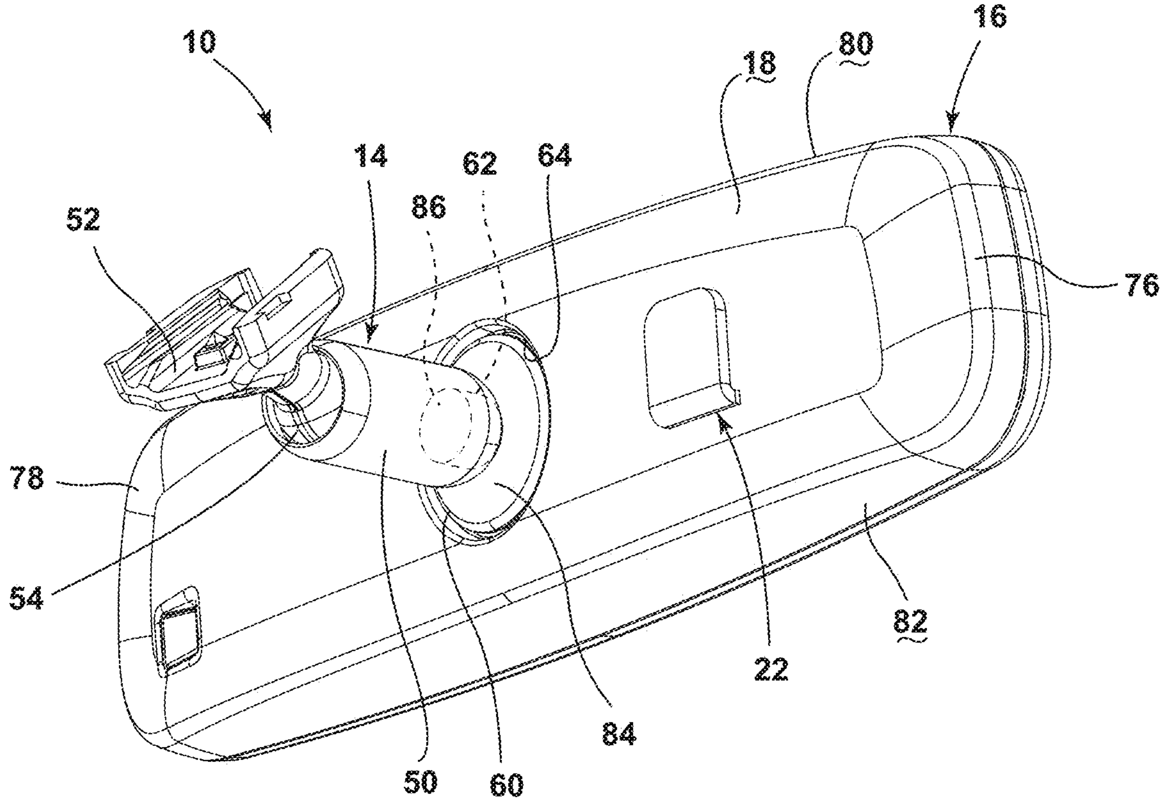
FIG. 2 is a side perspective view of a rearview mirror assembly with a tag hook, according to the present disclosure.

Referring still to FIG. 1, as well as FIG. 2, the vehicle 12 includes a vehicle body 40 that defines an interior compartment 42. The interior compartment 42 includes or is configured as a passenger cabin for passengers or occupants of the vehicle 12, generally including a driver. The rearview mirror assembly 10 is operably coupled to the vehicle 12. The rearview mirror assembly 10 may be coupled to a windshield 44, as illustrated in FIG. 1, Additionally or alternatively, the rearview mirror assembly 10 may be coupled to a unit or structure coupled, which may be coupled to the windshield 44 or a headliner within the vehicle 12. The rearview mirror assembly 10 may be coupled to the vehicle 12 in any practicable manner without departing from the teachings herein.

The rearview mirror assembly 10 is generally centrally located relative to the windshield 44 to provide a reflected image to the driver of the vehicle 12. The rearview mirror assembly 10 includes the mirror 28, which is coupled to the housing 16 and disposed within the opening 20. The mirror 28 is generally setback into the opening 20, forming a rim 46 extending about the mirror 28. The mirror 28 of the rearview mirror assembly 10 is oriented in the vehicle-rearward direction to provide the reflected image, which generally corresponds with a field of view of the rearview mirror assembly 10. The field of view of the mirror 28, and consequently the rearview mirror assembly 10, generally encompasses an area to a rear or behind the vehicle 12.

The field of view and, consequently, the reflected image may be adjusted by moving the rearview mirror assembly 10 or components thereof. The rearview mirror assembly 10 includes the support arm 14 for coupling the housing 16 of the rearview mirror assembly 10 to the vehicle 12. The support arm 14 may be configured to move relative to the vehicle 12 and/or the housing 16 may be configured to move relative to the support arm 14.

The support arm 14 includes an engagement feature 50 and a connecting feature 52. The connecting feature 52 is configured to engage the vehicle 12 and is rotatably coupled to the engagement feature 50. In the illustrated configuration, a joint 54 between the connecting feature 52 and the engagement feature 50 is a ball joint 54 allowing for increased movement of the engagement feature 50 relative to the connecting feature 52. The engagement feature 50 extends between the connecting feature 52 and the housing 16. Generally, the engagement feature 50 is a tube-like structure configured to receive a portion of each of the connecting feature 52 and a connector 60 of the rearview mirror assembly 10.

Referring still to FIGS. 1 and 2, a joint 62 between the connector 60 and the engagement feature 50 is generally a second ball joint 62, increasing a range of motion of the housing 16 relative to the support arm 14. The housing 16 defines an aperture or recessed region 64 in the outer surface 18 to receive the connector 60. The recessed region 64 is in a central location between first and second side ends 76, 78 of the housing 16, as well as between upper and lower surfaces 80, 82 of the housing 16. The connector 60 is disposed within the recessed region 64 at the central location and coupled to the housing 16 to engage the support arm 14.

The connector 60 includes a base 84 coupled to the housing 16 and a projection 86, which is at least partially inserted into the engagement feature 50 to form the second ball joint 62. The base of the connector 60 is generally fully positioned in a recess defined by the recessed region 64, such that a surface of the base 84 is aligned or flush with the outer surface 18 of the housing 16. The projection 86 extends outwardly from the base 84, beyond the outer surface 18 of the housing 16 to engage the support arm 14. The two ball joints 54, 62 allow the support arm 14 to be adjusted relative to the vehicle 12, and the housing 16 may also be adjusted relative to the support arm 14 to provide different reflected images to the driver by changing the field of view of the rearview mirror assembly 10.

Figure 3:
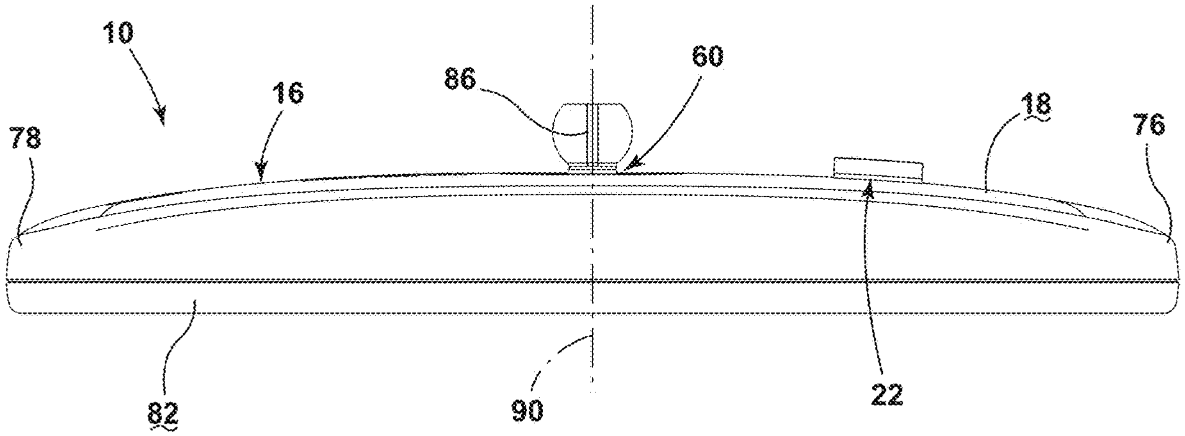
FIG. 3 is a bottom plan view of a rearview mirror assembly with a tag hook, according to the present disclosure.
Figure 4:
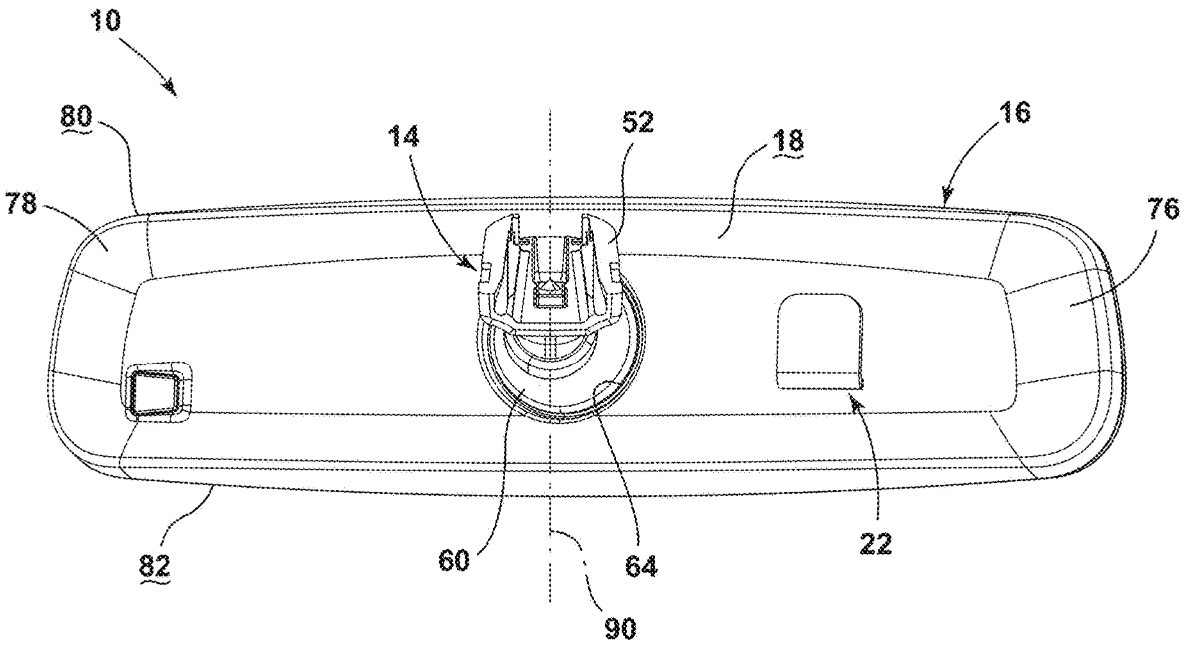
FIG. 4 is a rear perspective view of a rearview mirror assembly with a tag hook, according to the present disclosure.
Figure 5:
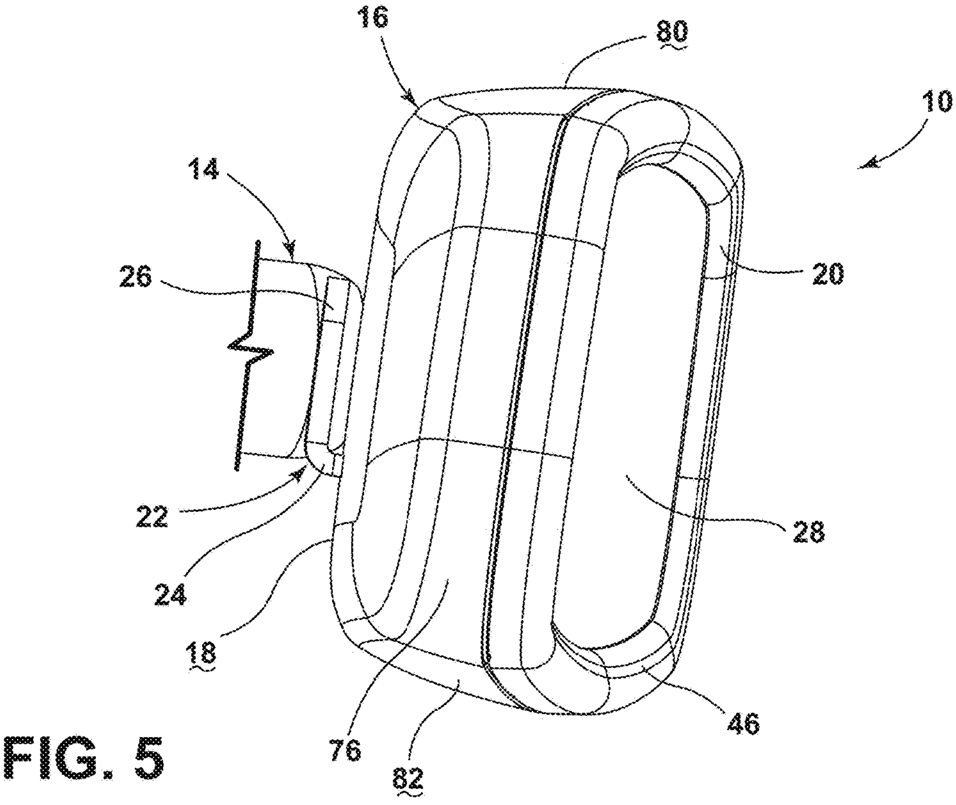
FIG. 5 is a partial side perspective view of a rearview mirror assembly with a tag hook, according to the present disclosure.

Referring to FIGS. 3-5, the housing 16 includes the outer surface 18, which is generally oriented in the vehicle-forward direction toward the windshield 44 (FIG. 1). The outer surface 18 forms a back portion of the rearview mirror assembly 10 as viewed by the driver in the vehicle 12. The outer surface 18 of the housing 16 defines a generally continuous arced shape from the first side end 76 to the second side end 78 of the housing 16. The outer surface 18 forms a generally consistent, smooth parabolic shape across the back of the rearview mirror assembly 10. The base 84 of the connector 60 contributed to the smooth arced shape of the housing 16, with the projection 86 extending outwardly from the outer surface 18.

The tag hook 22 is coupled to the outer surface 18 on the smooth parabolic shape. The tag hook 22 is disposed between the first side end 76 of the housing 16 and the recessed region 64 with the connector 60. An area of the outer surface 18 between the recessed region 64 and the first side end 76 of the housing 16 is generally smooth such that the tag hook 22 protrudes relative to the outer surface 18. In other words, an entirety of the tag hook 22 protrudes relative to the outer surface 18. Accordingly, the housing 16 is free of any recesses around the tag hook 22 into which the tag hook 22 could extend.

In the illustrated configuration, the rearview mirror assembly 10 includes a single tag hook 22. In this way, the tag hook 22 is disposed on a single lateral side of the rearview mirror assembly 10. With a single tag hook 22 included on the housing 16, the rearview mirror assembly 10 is generally free of any additional tag hooks 22 or other projections between the connector 60 and the second side end 78 of the housing 16. In this way, the rearview mirror assembly 10 is generally asymmetrical over a central axis 90, which extends through the connector 60. The single tag hook 22 configuration may allow the rearview mirror assembly 10 to support various items hanging on thereon, without promoting too many items being supported on the rearview mirror assembly 10. However, having multiple tag hooks 22 in various locations is contemplated without departing from the teachings herein.

In various examples, the tag hook 22 is located between the connector 60 and the first side end 76 of the housing 16, which generally corresponds with a driver side of the rearview mirror assembly 10. Accordingly, the driver may have increased and convenient access to the tag hook 22. As illustrated, the tag hook 22 is centrally located between the connector 60 and the first side end 76 of the housing 16, as well as centrally located between the upper and lower surfaces 80, 82 of the housing 16. The tag hook 22 is generally horizontally aligned with the connector 60.

The tag hook 22 is positioned on an opposing side of the housing 16 relative to the mirror 28 between the mirror 28 and the windshield 44. The tag hook 22 is coupled to the outer surface 18 of the housing 16. The tag hook 22 may be a separate component coupled to the housing 16. In such examples, the housing 16 may be molded or otherwise formed and the tag hook 22 may be attached via various methods, such as adhesives, fasteners, mating connectors, etc. In additional or alternative examples, the tag hook 22 may be integrally formed or integrated with the housing 16. In such examples, the tag hook 22 is formed with the housing 16 during a molding process. Accordingly, the housing 16 and the tag hook 22 are generally constructed of similar or the same materials, such as, for example, plastic materials. In integral tag hook 22 examples, the tag hook 22 and the housing 16 are molded together to form a single molded component. This configuration may be advantageous for maximizing efficiency of the manufacturing process.

The tag hook 22 extends outward from the outer surface 18 in the vehicle-forward direction and then vertically upward (e.g., toward the upper surface 80). Accordingly, the tag hook 22 generally protrudes a consistent distance from the outer surface 18 along a height of the tag hook 22. The tag hook 22 includes the support portion 24 extending outwardly from the outer surface 18. The support portion 24 extends generally perpendicular to the outer surface 18, forming a lower support with a lower support surface 96 for the tag hook 22. The support portion 24 forms the bottom of the tag hook 22. The support portion 24 generally extends less than about 8 mm, often less than about 5 mm, and often less than 3 mm from the outer surface 18.

A corner 98 is defined between the support portion 24 and the retaining portion 26 of the tag hook 22. The corner 98 is generally rounded. This configuration may be advantageous for maximizing the manufacturing or molding process.

The retaining portion 26 extends from a distal end of the support portion 24. The retaining portion 26 extends in a single direction from the support portion 24, extending toward the upper surface 80 of the housing 16. The retaining portion 26 has generally flat surfaces 102, 104 from the corner 98 to a top 106 of the tag hook 22, which increases the ease of hanging items from the tag hook 22. The retaining portion 26 extends adjacent to the outer surface 18 and may extend generally parallel to the outer surface 18 of the housing 16.

Figure 6:
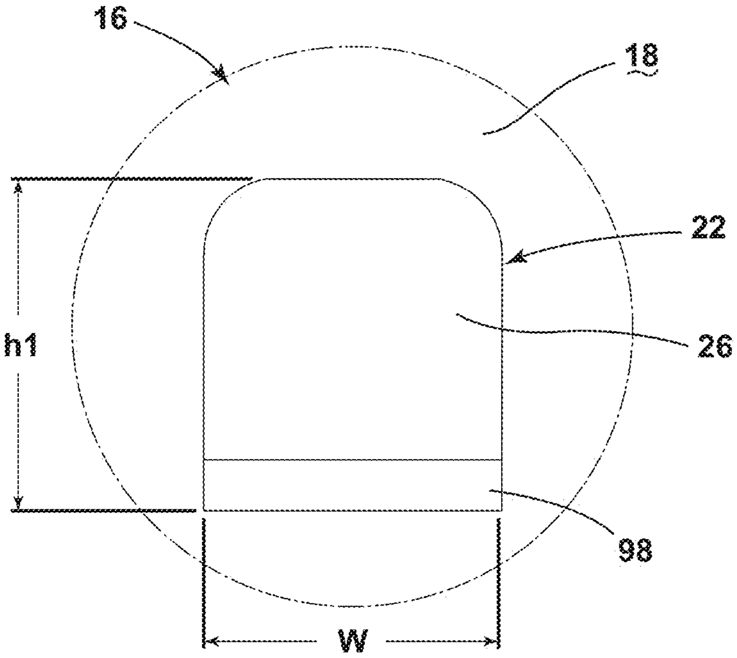
FIG. 6 is an enlarged rear elevational view of a tag hook on a rearview mirror assembly, according to the present disclosure.
Figure 7:
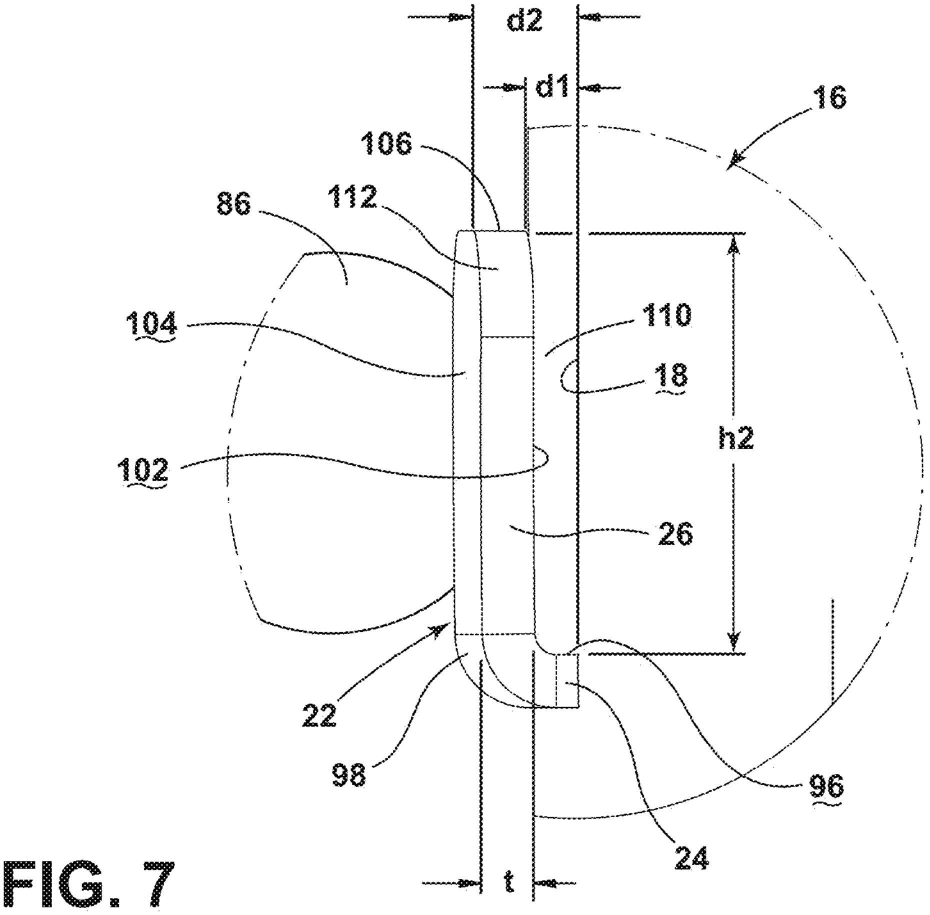
FIG. 7 is an enlarged side perspective view of a tag hook on a rearview mirror assembly, according to the present disclosure.

Referring still to FIGS. 3-5, as well as FIGS. 6 and 7, the tag hook 22 and the outer surface 18 of the housing 16 define a storage or receiving space 110 for receiving items to hang and be supported by the tag hook 22. A height $h_1$ of the retaining portion 26 is between about 15 mm and about 30 mm, often between about 20 mm and about 25 mm, and often about 22.5 mm. Accordingly, a height $h_2$ of the storage space 110 from the lower support surface 96 of the support portion 24 to the top 106 of the tag hook 22 is between about 15 mm and about 25 mm, and often between about 15 mm and about 20 mm. These heights $h_1$, $h_2$ are advantageous for retaining items on the tag hook 22. The items on the tag hook 22 may move, and possibly move vertically, which can occur when the vehicle 12 (FIG. 1) is traveling along rough or bumpy surfaces. The heights $h_1$, $h_2$ of the receiving space 110 and the retaining portion 26 allow the items on the tag hook 22 to move while being retained on the tag hook 22.

Further, the receiving space 110 is defined between the surface 102 of the retaining portion 26, the lower support surface 96 of the support portion 24, and the outer surface 18 of the housing 16. The receiving space 110 generally has a similar size as a thickness/of the tag hook 22. In various examples, a distance $d_1$ between the outer surface 18 of the housing 16 and the surface 102 of the retaining portion 26 is less than about 5 mm, and often less than about 3 mm, and often about 2.5 mm. In the illustrated configuration, the distance $d_1$, which is the thickness of the receiving space 110, is about 2.5 mm.

Further, a width w of the tag hook 22 also assists with retaining items on the tag hook 22. The tag hook 22 generally has a consistent width w, with corners 112 at the top 106 of the retaining portion 26 being rounded, which may be advantageous for maximizing the efficiency of the manufacturing process. The width w is between about 15 mm and about 25 mm, and often about 20 mm. This width w may assist with supporting items on the tag hook 22, reducing the movement of items on the tag hook 22, and retaining items on the tag hook 22.

The tag hook 22 generally has a consistent thickness/from where the support portion 24 extends from the outer surface 18 to the top 106 of the tag hook 22. The tag hook 22 has a thickness/of less than about 5 mm, often less than about 3 mm, and often about 2.5 mm. In this way, the tag hook 22 has a narrow and slim configuration that allows the hanging of items on the tag hook 22 without substantially impinging on the function of the rearview mirror assembly 10. Moreover, items that are supported by the tag hook 22 are often permits and passes, collectively referred to herein as tags. The tags are often formed from paper products and have hook features or apertures and the narrow configuration is advantageous for moving the hook feature or aperture over the tag hook 22 in a more convenient and efficient manner.

Generally, the tag hook 22 extends a distance $d_2$ less than about 8 mm and often about 5 mm from the outer surface 18 of the housing 16. The illustrated configuration, which is a non-limiting example of the tag hook 22, is about 22.5 mm in height $h_1$, about 20 mm in width w, and about 5 mm in depth $d_2$ (e.g., including a thickness $d_1$ of the receiving space 110 and the thickness/of the tag hook 22). Further, the thickness/of the tag hook 22 may be substantially similar to a thickness of the housing 16, which may further maximize the efficiency of the manufacturing process.

Figure 8:
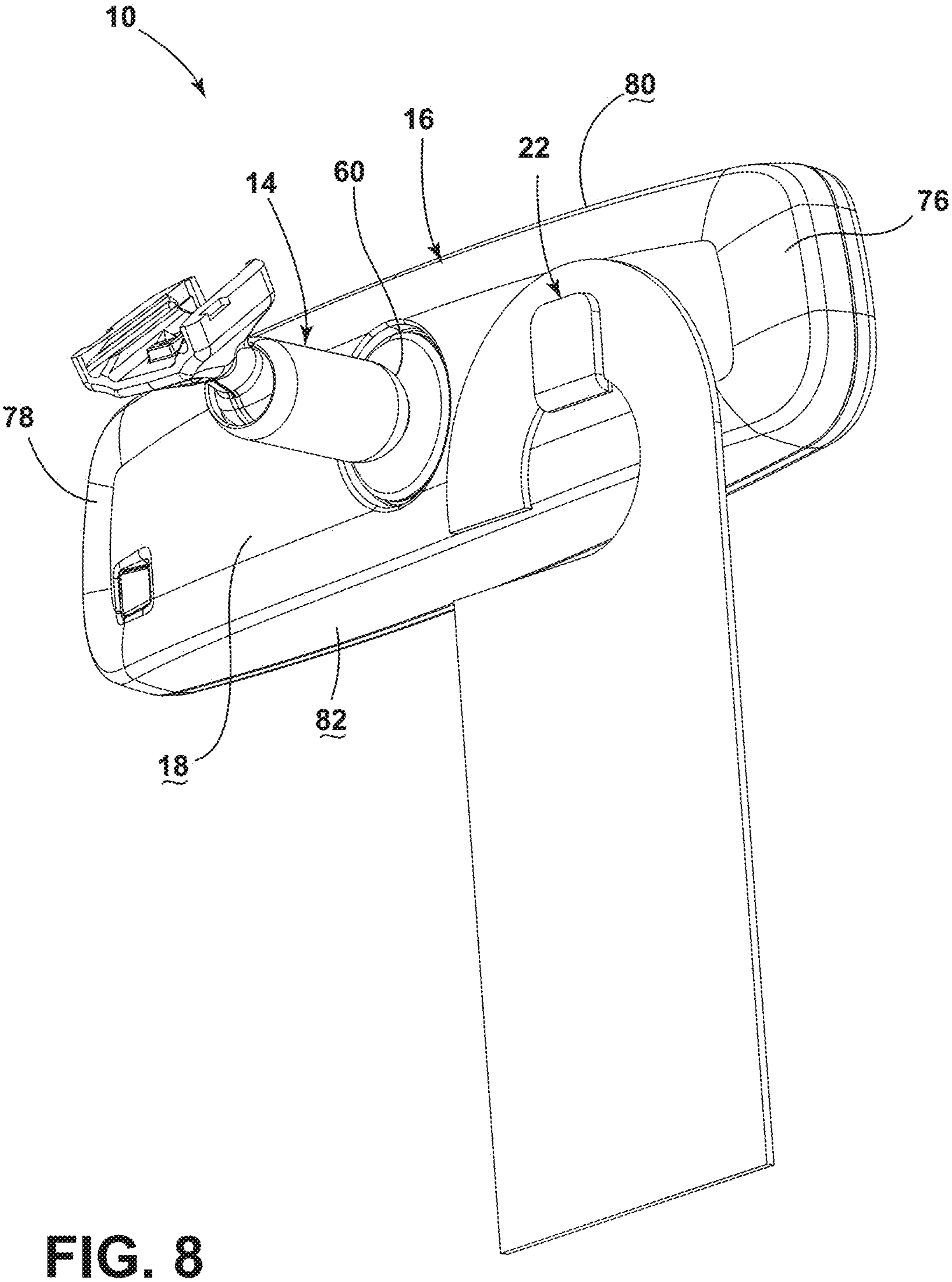
FIG. 8 is a side perspective view of a rearview mirror assembly with a tag hanging on a tag hook, according to the present disclosure.
Figure 9:
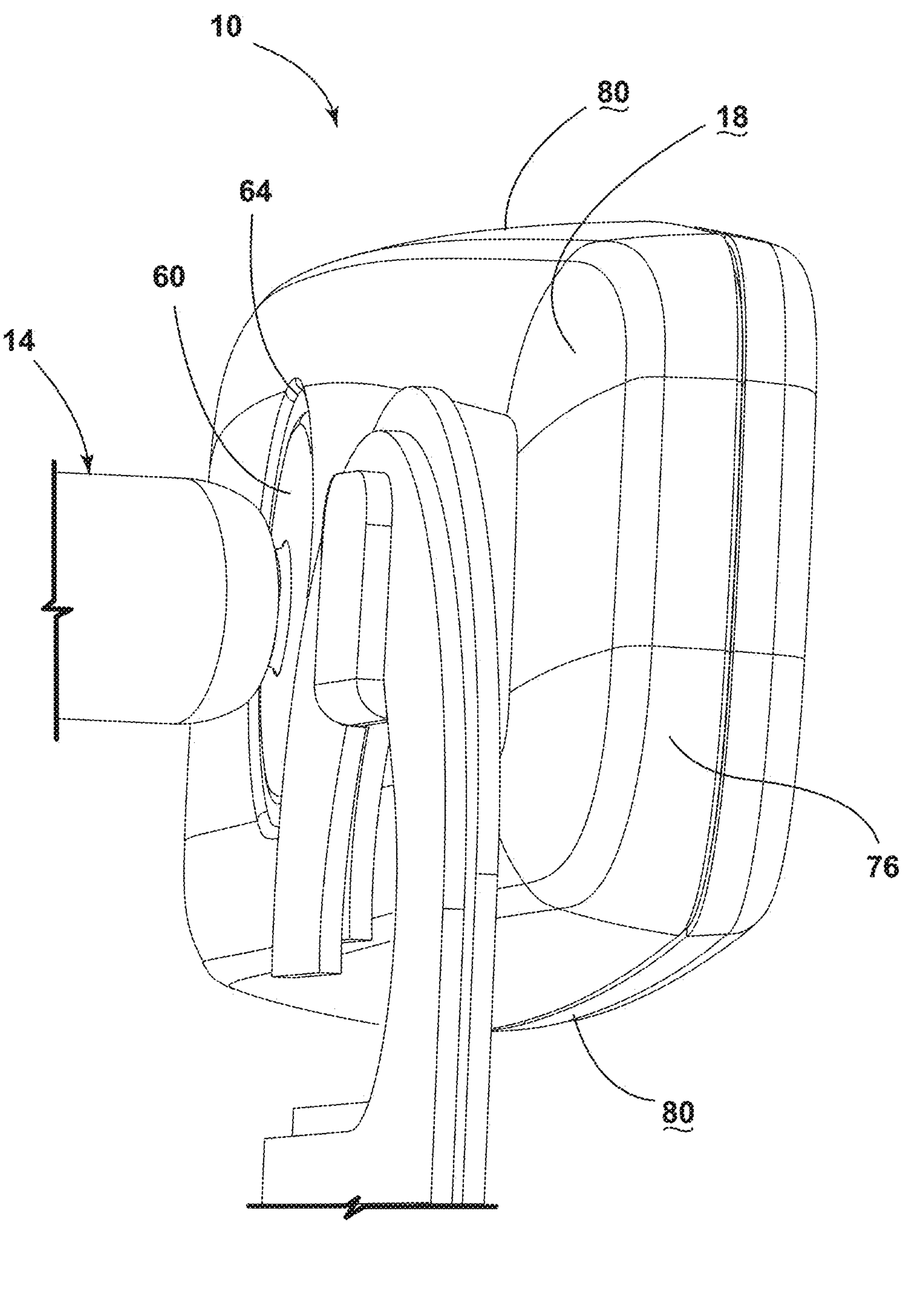
FIG. 9 is an enlarged partial side perspective view of a rearview mirror assembly with multiple tags hanging on a tag hook, according to the present disclosure.

Referring to FIGS. 8 and 9, the tag hook 22 extends adjacent to the outer surface 18 forming a general "L" shape, allowing for items to be hung on the tag hook 22. The narrow, slim configuration of the tag hook 22 increases the user experience by maximizing convenience and efficiency for hanging items, such as tags on the tag hook 22. The tag hook 22 is generally integrated into the housing 16, providing a fixed accessory for the vehicle 12 for storing multiple tags. The tag hook 22 allows the driver to organize and store multiple tags, while providing convenient access to the tags when desired. The tag hook 22 is configured to support tags of multiple sizes, as well as multiple tags at a single time. The tag hook 22 reduces or eliminates the need for additional components or accessories to be added to the vehicle 12 for the tags, which may be lost over time. Further, the slim configuration of the tag hook 22 reduces wear on the tags, which often leads to damaged tags over time. Additionally, the L-shaped configuration of the tag hook 22 having the tall storage space 110 for hanging tags, assists in retaining the tags on the hook, particularly and bumpy or rough road conditions.

Use of the present device may provide for a variety of advantages. For example, the rearview mirror assembly 10 includes the tag hook 22 for supporting and storing items, such as tags. Additionally, the tag hook 22 has a narrow configuration, minimizing any effect on the function and movement of the rearview mirror assembly 10. Also, the narrow or slim configuration is advantageous for maximizing the ease of adding the tags onto the tag hook 22. Further, the tag hook 22 has the support portion 24 and the retaining portion 26 extending vertically from the support portion 24 to form an L-shape. Also, the L-shape of the tag hook 22 is advantageous for holding the tags on the tag hook 22 in various types of road conditions. Additionally, the tag hook 22 is configured to support multiple sizes of tags and multiple tags at a single time. Moreover, the location of the tag hook 22 on the driver side provides convenient access for the driver to add, remove, or adjust tags on the tag hook 22. Additional benefits or advantages may be realized and/or achieved.

The device disclosed herein is further summarized in the following paragraphs and is further characterized by combinations of any and all of the various aspects described therein.

According to various examples, a vehicle rearview mirror assembly includes a support arm configured to engage a vehicle. A rearview mirror assembly is operably coupled to the support arm. The rearview mirror assembly includes a housing that has an outer surface configured to be oriented in a vehicle-forward direction. The housing defines an opening. A tag hook is coupled to the outer surface of the housing. The tag hook includes a support portion extending from the outer surface and a retaining portion extending vertically from the support portion. A mirror is disposed within the opening of the housing. Embodiments of the present disclosure may include one or a combination of the following features:

- the rearview mirror assembly includes a connector operably coupled to the support arm, wherein the connector is centrally located relative to the housing;
- the tag hook is disposed on a driver side of the connector;
- the housing is asymmetrical over a central axis;
- the tag hook extends less than 8 mm from the outer surface of the housing;
- the retaining portion extends from a distal end of the support portion and adjacent to the outer surface of the housing to form an L-shape;
- the tag hook is integrally formed with the housing as a single molded component;
- the outer surface defines a continuous arced shape from a first end to a second end of the housing; and
- the tag hook has a height between 20 mm and 25 mm.

According to various examples, a rearview mirror assembly includes a housing that has an outer surface. The housing defines a connector for receiving a support arm. The housing includes an integral tag hook. The integral tag hook includes a support portion extending from the outer surface of the housing. A retaining portion extends vertically from the support portion. The retaining portion extends adjacent to the outer surface of the housing. The integral tag hook and the outer surface define a receiving space for hanging items on the integral tag hook. A mirror is disposed within an opening defined by the housing. The integrated tag hook and the mirror are on opposing sides of the housing. Embodiments of the present disclosure may include one or a combination of the following features:

- the receiving space defined between the outer surface and the tag hook has a height between 15 mm and 25 mm;
- the retaining portion extends parallel to the outer surface of the housing;
- the integral tag hook is defined between the connector and an end of the housing;
- the tag hook has a thickness of less than 3 mm;
- the integral tag hook extends less than 8 mm from the outer surface of the housing;
- the connector and the tag hook are horizontally aligned on the outer surface; and
- the outer surface of the housing forms a continuous arced shape from a first end of the housing to a second opposing end.

According to various examples, a vehicle mirror assembly includes a housing that defines an opening. The housing includes an outer surface forming an arced shape. A connector is operably coupled to the outer surface and configured to receive a support arm. A tag hook is integrally formed with the housing. The tag hook includes a lower support portion that extends from the outer surface and a retaining portion extending vertically from the lower support portion to hold an item. A mirror is disposed within the opening of the housing. Embodiments of the present disclosure may include one or a combination of the following features:

the retaining portion extends in a single direction from the lower support portion to form an L-shape;

the housing defines a recessed region at a central location;

the connector is disposed within the recessed region;

the tag hook is centrally located between the connector and a side end of the housing and centrally located between an upper surface and a lower surface of the housing;

the tag hook has a thickness of less than 3 mm; and a distance between the retaining portion of the tag hook and the outer surface of the housing is less than 3 mm.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle rearview mirror assembly, comprising:

a support arm configured to engage a vehicle; and a rearview mirror assembly operably coupled to the support arm, wherein the rearview mirror assembly extends laterally from a central vertical axis in two opposing directions to form a first assembly half and a second assembly half, wherein the first assembly half and the second assembly half define different outer profiles, and wherein the rearview mirror assembly includes:

a housing having an outer surface configured to be oriented in a vehicle-forward direction, wherein the housing defines an opening;

a tag hook coupled to the outer surface of the housing, wherein the tag hook includes:

a support portion extending from the outer surface and having a first length; and a retaining portion extending vertically from the support portion and having a second length that is at least twice the first length; and a mirror disposed within the opening of the housing.

2. The vehicle rearview mirror assembly of claim 1, wherein the rearview mirror assembly includes a connector operably coupled to the support arm, wherein the connector is centrally located relative to the housing, and wherein the tag hook is disposed on a driver side of the connector.

3. The vehicle rearview mirror assembly of claim 1, wherein the tag hook extends less than 8 mm from the outer surface of the housing.

4. The vehicle rearview mirror assembly of claim 1, wherein the retaining portion extends from a distal end of the support portion and adjacent to the outer surface of the housing to form an L-shape.

5. The vehicle rearview mirror assembly of claim 1, wherein the tag hook is integrally formed with the housing as a single molded component.

6. The vehicle rearview mirror assembly of claim 1, wherein the tag hook has a height between 20 mm and 25 mm.

7. A rearview mirror assembly, comprising:

a housing extending between a first outer end of said rearview mirror assembly and a second outer end of said rearview mirror assembly, the housing having an outer surface that forms a continuous arced shape extending from the first outer end of said rearview mirror assembly to the second outer end of said rearview mirror assembly;

a connector coupled to the housing and configured to engage a support arm;

an integral tag hook integrally formed with the housing, the integral tag hook including:

a support portion extending from the outer surface of the housing; and a retaining portion extending vertically from the support portion, the retaining portion extending adjacent to the outer surface of the housing, wherein the integral tag hook and the outer surface define a receiving space for hanging items on the integral tag hook; and a mirror disposed within an opening defined by the housing, wherein the integral tag hook and the mirror are on opposing sides of the housing.

8. The rearview mirror assembly of claim 7, wherein the retaining portion extends parallel to the outer surface of the housing.

9. The rearview mirror assembly of claim 7, wherein the integral tag hook is disposed on the continuous arced shape of the outer surface between the connector and an end of the housing.

10. The rearview mirror assembly of claim 7, wherein each of the support portion of the integral tag hook and the retaining portion of the integral tag hook has a consistent thickness of less than 3 mm, and wherein the integral tag hook extends less than 8 mm from the outer surface of the housing.

11. The rearview mirror assembly of claim 7, wherein the connector and the integral tag hook are horizontally aligned on the outer surface.

12. A vehicle mirror assembly, comprising:

a housing defining an opening, and a recessed region at a central location, wherein the housing includes:

an outer surface forming an arced shape;

a connector operably coupled to the outer surface of the housing and configured to engage a support arm, wherein the connector is disposed within the recessed region, and wherein the connector includes:

a base disposed in the recessed region such that an outer surface of the base is flush with the outer surface of the housing; and a projection extending outwardly from the base and away from the outer surface of the housing, wherein the projection is configured to engage the support arm; and a tag hook integrally formed with the housing, wherein the tag hook includes a lower support portion extending from the outer surface of the housing and a retaining portion extending vertically from the lower support portion to hold an item, wherein the tag hook has a uniform thickness along the lower support portion and the retaining portion; and a mirror disposed within the opening of the housing.

13. The vehicle mirror assembly of claim 12, wherein the retaining portion extends in a single direction from the lower support portion to form an L-shape, and wherein the tag hook has a uniform width along both the lower support portion and the retaining portion.

14. The vehicle mirror assembly of claim 12, wherein the tag hook is centrally located between the connector and a side end of the housing and centrally located between an upper surface and a lower surface of the housing.

15. The vehicle rearview mirror assembly of claim 1, wherein the retaining portion is spaced from the outer surface by a distance, wherein the tag hook and the outer surface together define a storage space configured to receive an item, and wherein a ratio of a height of the storage space to the distance between the retaining portion and the outer surface is at least 3:1.

16. The rearview mirror assembly of claim 7, wherein the continuous arced shape of the outer surface is a consistent parabolic shape.

17. The rearview mirror assembly of claim 7, wherein the integral tag hook further includes:

a first surface extending continuously along the support portion and the retaining portion and at least partially facing toward the outer surface; and a second surface extending continuously along the support portion and the retaining portion and at least partially facing away from the outer surface, and wherein the first surface and the second surface are substantially parallel at the retaining portion, and further wherein each of the first surface and the second surface has an L-shaped side profile.

* * * * *